United States Patent

Shotwell et al.

[15] 3,645,115
[45] Feb. 29, 1972

[54] UNIVERSAL JOINT WITH LAMINATE BEARINGS

[72] Inventors: Daniel B. Shotwell, Washington; Arthur J. Ritter, Metamora, both of Ill.

[73] Assignee: Catermillar Tractor Co., Peoria, Ill.

[22] Filed: Oct. 5, 1970

[21] Appl. No.: 77,818

[52] U.S. Cl. ...................................................64/17 A
[51] Int. Cl. ....................................................F16d 3/28
[58] Field of Search.........................................64/17

[56] References Cited

UNITED STATES PATENTS 3,087,314  4/1963  Jarvis et al.......................64/17
3,241,336  3/1966  Nemtson..........................64/17

Primary Examiner—Edward G. Favors
Attorney—Fryer, Tjensvold, Feix, Phillips & Lempio

[57] ABSTRACT

A universal joint employs a spider which is normally journaled with its input and output forks with the needle bearings but according to this invention the needle bearings are replaced with laminated bearings formed of thin layers of metal and elastomer in which the cylindrical metal layers or shells are each formed by helically wrapping a metal band in an edge-abutting relationship on an elastomer layer to form the concentric shells.

13 Claims, 11 Drawing Figures

INVENTORS
DANIEL B. SHOTWELL
ARTHUR J. RITTER

PATENTED FEB 29 1972
3,645,115
SHEET 4 OF 4
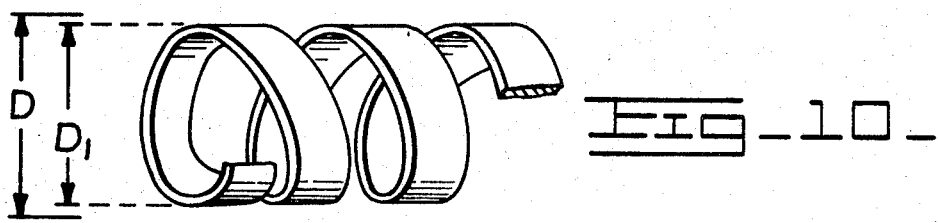
Fig_10_
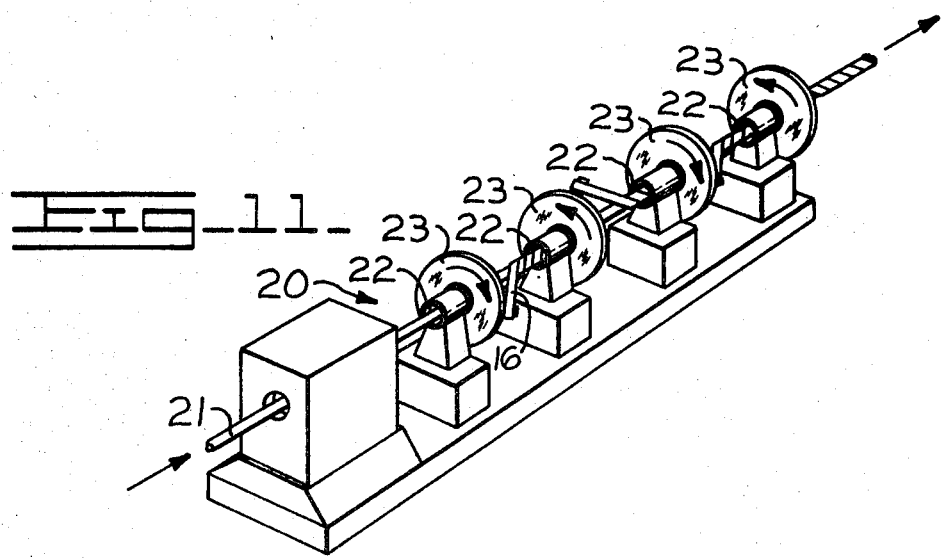
Fig_11_
INVENTORS
DANIEL B. SHOTWELL
ARTHUR J. RITTER
BY
ATTORNEYS 3,645,115

UNIVERSAL JOINT WITH LAMINATE BEARINGS

BACKGROUND OF THE INVENTION

Due to slight misalignments between the rotational axes of end-coupled shafts in machinery, especially in the drive train of vehicles, such as cars, trucks and tractors, universal joints are employed to couple the shafts. In vehicles where such universal joints connect the prime mover with the ground-engaging members relatively high torques in both rotational directions are transmitted through the universal joint. As a result the universal joint must accommodate relatively high bidirectional torques without appreciable rotational lost motion since the latter can damage the universal joint and other components in the drive train.

Typically, due to the above circumstances, needle bearings are employed in the journals between the spider and the input and output forks to accommodate the high-torsional loadings. However, needle bearings require precision machining, are manufactured of expensive materials and require special heat treatment, all of which makes their employment in journals of conventional universal joints expensive. Further, needle bearings require periodic lubrication for satisfactory service-life and performance. Backlash in the gear train occurring during torque reversals are particularly detrimental to needle bearings since there is no cushioning in the several journals. As a result, conventional universal joints often have a high failure rate and must be replaced frequently which is both expensive and time consuming in heavier vehicles, such as tractors.

An object of the present invention is to provide a new universal joint employing inexpensive laminated elastomer and metal bearings having extended service-life.

Another object of the invention is to provide a universal joint capable of handling high bidirectional torques which has a lower cost and yet improved performance over conventional universal joints with needle bearings.

Still another object is to avoid the necessity of periodic lubrication in universal joints having high bidirectional torque transmission capacity.

Other objects and advantages will be apparent in the following description of this invention.

SUMMARY OF THE INVENTION

A high-capacity bidirectional universal joint includes a spider and two forks journaled on the spider, with the forks being journaled for oscillation about mutually perpendicular axes and laminated bearings in each journal, each laminated bearing being composed of a plurality of alternate concentric shells of elastomer and metal with the metallic shells formed by helically winding a band of metal in an edge-abutting relationship whereby substantially concentric shells of metal and elastomer are formed.

Also when high torques are involved it is desirable to radially preload each bearing to reduce its radial deflection under compressive loading thereby angularly limiting the cushioned backlash in the new universal joint.

BRIEF DESCRIPTION OF THE DRAWINGS

FIG. 10 illustrates the "curl" in perspective of a metallic bearing shell of a metallic band passed through the dies shown in FIG. 9; and FIG. 11 is a perspective of a typical winding machine which can be employed to manufacture the novel bearing material.

BACKGROUND OF THE INVENTION

Figure 3:
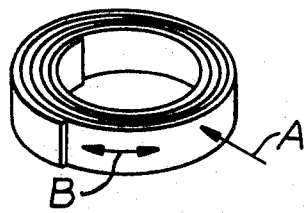
FIG. 3 is a prior art laminated bearing which is unsatisfactory for the new universal joint.

Prior art laminated bearings as shown in FIG. 3 are unsatisfactory for the new universal joint construction of this invention since they have an extremely short life in such applications. While laminated bearings of the type disclosed in the U.S. Pat. No. 3,071,422 issued to Hinks generally allow a significant reduction in both size and weight in a given bearing application over their contemporary elastomer counterparts, they are unsatisfactory for universal joint applications. However, they have no metal-to-metal sliding surfaces and thus, eliminate wearing, galling and fretting without any requirement for lubrication. Also, they eliminate the "break out" forces normally found in more conventional bearings and since both initial costs and maintenance costs of these laminated bearings tend to be low, they are attractive for applications which are compatible with their characteristics and capabilities.

In the past, as noted above, the characteristics and capabilities of the prior art laminated bearings are not been satisfactory for applications in which high radial loadings are involved, along with torsional deflections between articulated parts; for example, in universal joints. The current invention is designed to provide a universal joint using laminated cylindrical bearings capable of withstanding high radial loadings, coupled with torsional deflections along with some cushioning in the universal joint.

A typical prior art bearings of a laminated construction designed for radial loadings is illustrated in FIG. 3 with arrow A representing radial loadings and arrow B representing torsional loadings on the spiral wound laminated bearing. In contrast, the construction of the cylindrical bearing 11 used with the current invention is illustrated in FIGS. 4, 5, 6, 7, and 8, which differs appreciably in design and construction from the prior art bearing in that concentric and alternating cylindrical shells of elastomer and metal form the bearing.

Figure 5:
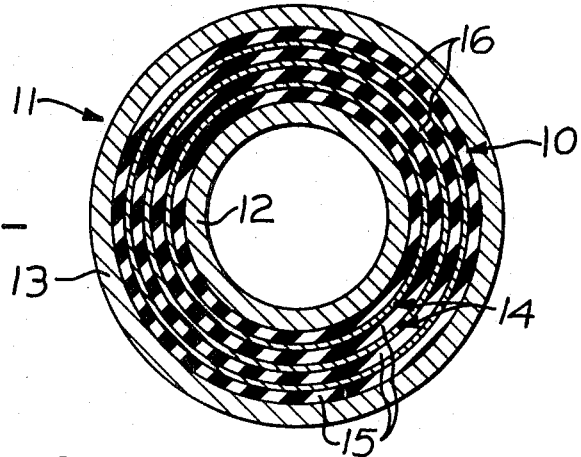
FIG. 5 is a radial cross section of the laminated bearing illustrated in FIG. 4.
Figure 6:
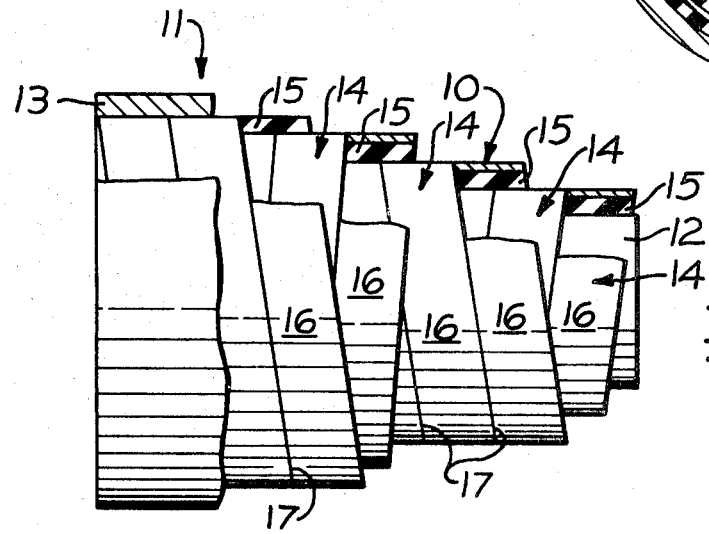
FIG. 6 is a side elevation of the bearing shown in FIG. 4 with parts broken away to show additional detail of its multiple alternating shells of metal and elastomers.
Figure 7:
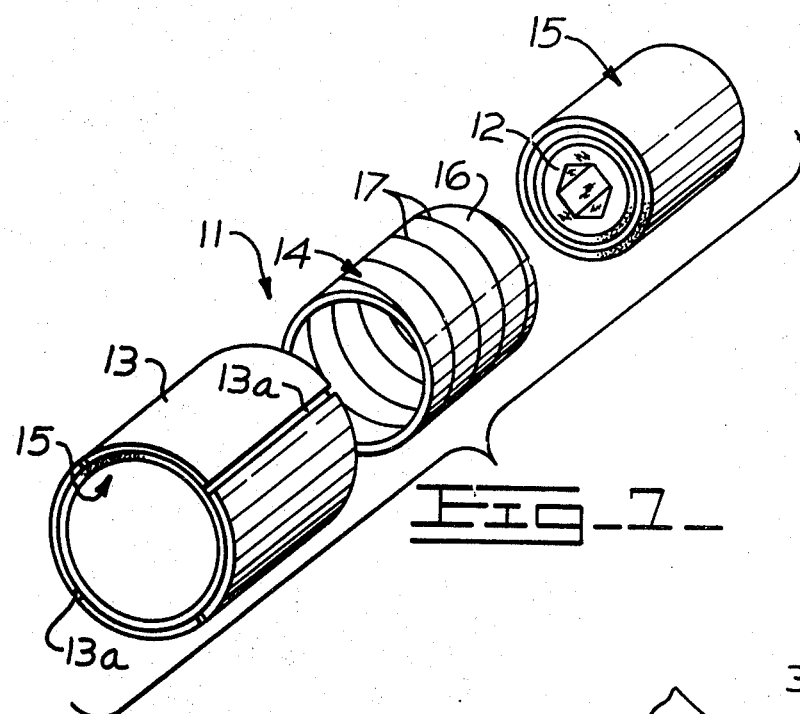
FIG. 7 is an exploded perspective of a bearing for the construction of the new universal joint.

In FIGS. 4, 5, 6, and 7, the bearing material 10 is illustrated assembled in a bearing 11 which confines it between an inner circular core 12 and an outer retaining sleeve 13, the latter of which may be segmented as illustrated in FIG. 7. The functions of the inner core and the retaining sleeve are normally to provide convenient bearing structures for mounting the bearing material in the universal joint.

In the universal joint where high radial loading will be experienced and limited radial deflection in the bearing occur, the retaining sleeve 13 (the unsegmented types) can be swaged or the inner core 12 ballized to place the bearing material under a radial preload, thereby reducing radial deflections, i.e., increasing radial stiffness. In the case of a segmented retaining sleeve, as illustrated in FIG. 7, the mating bearing support structures of the universal joint may be employed to "squeeze" the retaining sleeve to a smaller diameter (closing the gaps 13a) to apply a radial preload when the bearing structure is installed in the universal joint.

The actual configuration of the bearings is best shown in FIGS. 5, 6, and 7, wherein the wall thicknesses of the several shells are greatly exaggerated solely for the purpose of illustration, since wall thickness of the metallic shells 14 may be in the order of 0.0015 to 0.020 inch and the wall thickness of the elastomer shells 15 may be in the order of 0.005 to 0.060 inch.

The alternating shells 14 and 15 of elastomer and metal, respectively, are formed usually by building the bearing material 10 on a mandrel, laying up a first cylindrical shell on a mandrel or core 12 and subsequently laying up each successive shell on an immediate prior shell until the desired thickness of bearing material is achieved. Each metallic shell 14 is applied separately over an immediate prior shell, and a number of metallic shells can be applied simultaneously by wrapping a second metallic shell over one just completed with an elastomer shell disposed therebetween. A machine arrangement similar to one illustrated in U.S. Pat. No. 3,128,216 issued to Reed can be employed to fabricate the bearings. Employing such a machine, an axially continuous length of bearing material can be formed (lengths of 20 to 40 feet) which then can be cut radially into selected shortened lengths for the universal joint bearings 11.

In FIG. 11, a perspective of a wrapping machine 20 is illustrated in which a nonrotating mandrel 21 is axially advanced through apertures 22 of the several rotating winding decks 23, each of which contains spools wound with a metallic band 16 which is preferably a brass plated shim stock. The axial advanced of the mandrel is timed to the metallic bands 16 are helically wound in a substantially edge-abutting relationship making a tight abutting seam 17 between the convolutions for the helix forming each metallic shell of the cylindrical bearing.

Figure 8:
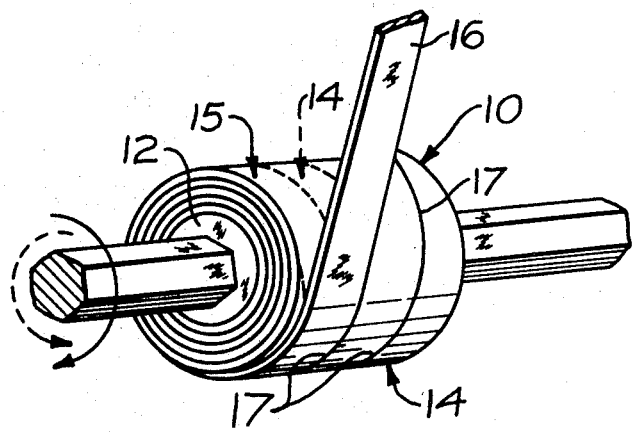
FIG. 8 is a perspective of the application of a metallic band by a helically winding operation, illustrating one method of the manufacture of the bearings.

In FIGS. 7 and 8, an important feature of the application of the metallic band 17 to a prior shell (elastomer shell 15) is illustrated. Each metallic band 16 is helically wound in tight edge-abutting relationship about a constant diameter and under tension, so the seams 17 will have a minimum "gap" and thus form a substantially continuous cylinder.

It should not be inferred from the above discussion that an elastomer shell 15 cannot be formed simultaneously with the metallic shell, as would be the case where the metallic band is coated with an elastomer on one or more of its faces before it is helically wound on the mandrel or a prior shell. Also, it should be appreciated that each subsequent metallic band is preferably wound in the opposite direction (see arrows on the winding decks 23 in FIG. 11), often referred to as opposite band, so the seams 17 of the adjacent metallic shells 14 are angularly disposed relative to the seams in the referenced metallic shell.

The alternation of the direction of wrap between adjacent metallic shells is very important when the cylindrical bearings are placed under torsional loadings since it makes the torsion stiffness uniform in either direction. This characteristic is obtained because adjacent helically wound metallic shells 14 tend to oppose one another under torsional loadings, one tending to windup, the other tending to unwind, depending on the direction of torsional deflection thereby providing the same compensation and torsional stiffness in either direction. Further, this feature tends to maintain the elastomer shells under a compressive load by limiting relative movement between adjacent metallic shells and also helps avoid the highly localized shear forces commonly found in spirally wrapped prior art bearings. Compensation for the "winding" of the metallic shell under torsional loads is provided since these shells can shorten or lengthen axially to accommodate these movements.

Another very important feature is achieved by the instant fabrication through a unitized bearing material in which "flow" of the elastomer is restricted when the bearing is placed under load, thereby limiting the deterioration of the elastomer caused by "working" across a plurality of edges of the metallic portions of the laminate. Since elastomers are substantially incompressible they tend to flow when placed under compressive loading (radial loading in the case of the instant invention) and bulge along and at the edges of the laminate where no confinement is provided. This action can only occur to a limited degree at the opposite ends of the circular bearing of this invention since the multiple metallic shells 14 and tight seams 17 restrict the "flow" of the elastomer in all other portions of the bearing, increasing radial stiffness and greatly lengthening service-life. It also allows the use of somewhat thicker elastomer shells whereby decreased torsional stiffness can be achieved without appreciable loss of radial stiffness. The feature allows a universal joint employing these bearings to "cushion" the backlash across the joint without deterioration of the elastomer.

Figure 9:
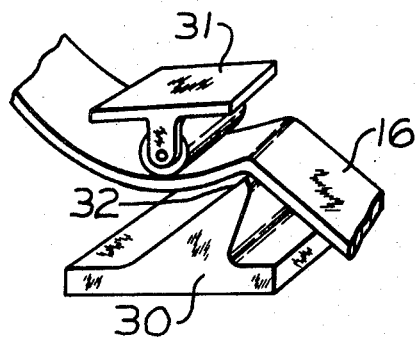
FIG. 9 is a perspective of simple dies employed in put a "-curl" in the metal band as it is wound into a metallic shell.

A technique to enhance the integrity of the bearings when not confined between an outer retaining sleeve 13 and an inner core 12 is to place a "curl" in the metallic band 16 as it is being wound using a simple sharp-edge die 30 as illustrated in FIG. 9. A guide 31 "back bends" the metallic band so it is drawn across the edge 32 of the die in its travel toward the mandrel when winding on the prior shell. As a result of this action, a "curl," as illustrated in FIG. 10, can be introduced into the band. By controlling the tension on the band and spacing between the die and guide, the diameter $D_1$ of the "curl" in a free state can be obtained which is less than the diameter D of the cylindrical metallic shell 14 formed on the band. This curl tends to prevent unraveling of the outer metallic shells of the bearing material. Also, when the bearing material is layed up on a machine its ends should be "clamped" to maintain the tightness of the wrap as each metallic sleeve is completed.

The elastomer employed in the fabrication can be selected from rubbers, natural, synthetic, silicone, viton, etc., which can be compounded for desired elastomeric properties such as hardness, modulus, set, hysteresis set, resiliency, thermal stability, etc. Also, since the metallic shell can be wound under considerable tension, some of the undesirable characteristics, such as "elastomer relation" can be partially compensated for during fabrication. The elastomers can be cured, uncured, bonded to or unbonded to the metallic shells in final bearings increasing the flexibility in achieving the desired parameters.

Normally, the metallic shells 14 will be formed of brass plated shim stock, though the use of any nonmetallic material is possible, if it maintains the necessary effective shape factor and has the other properties required.

Since there are not essential breaks or gaps in the metallic concentric shells forming the laminate of the bearings (except at its ends), the radial and torsional stiffnesses are uniform through 360° so no special bearing orientation with reference to the applied load is necessary.

Figure 1:
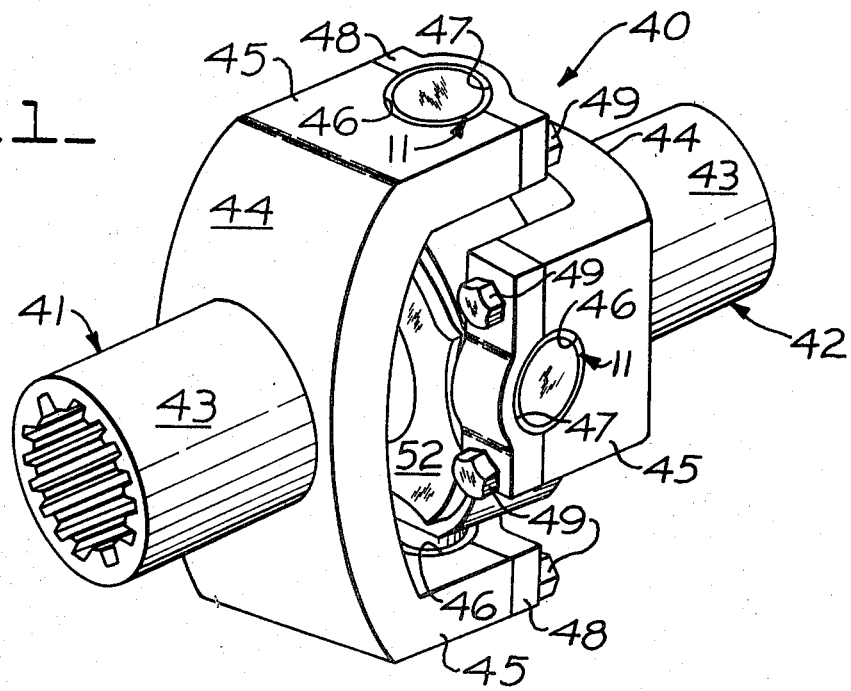
FIG. 1 is a perspective of a new universal joint employing laminated elastomer and metal bearings in its journals.
Figure 2:
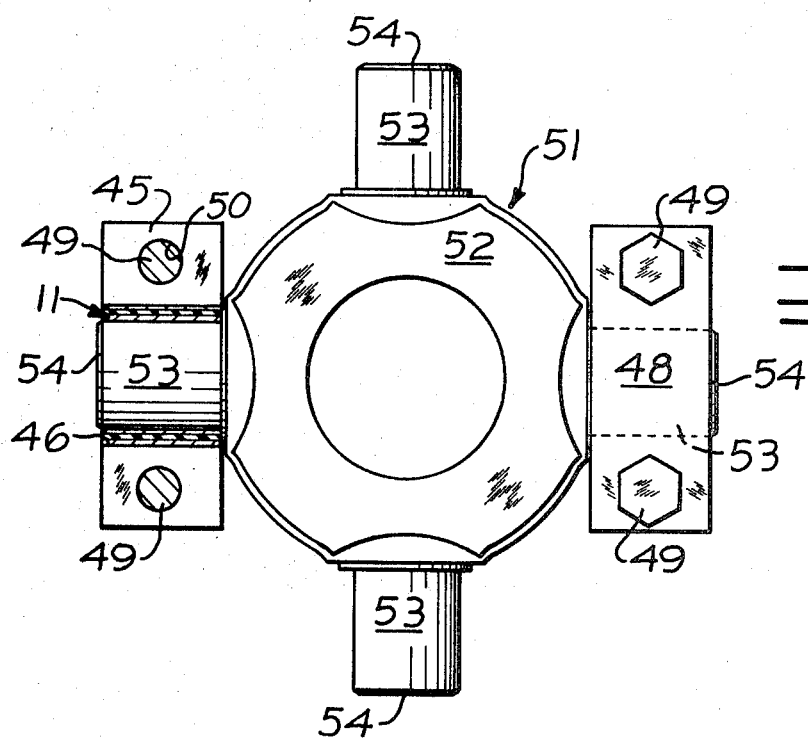
FIG. 2 is an end elevation with one of the forks removed to better illustrate the spider.

Referring to FIG. 1, a simple universal joint 40 is illustrated which is one type which can be build according to this invention. It includes two forks units which are designated as input fork 41 and output fork 42, respectively, for matter of convenience it being recognized that their functions could be and are reversed at times. Each fork has a female splined sleeve 43 attached to the base of a U-shaped member 44 so its respective ends may be innerlocked as illustrated in FIG. 1 when the U-shaped members are oriented mutually perpendicular to one another.

The spaced-apart, parallel sides 45 of each U-shaped member 44 include an arcuate aperture 46 in its outer end which is matched with a similar arcuate aperture 47 in an associated end cap 48 which is secured to the outer end with bolts 49 received in tapped bores 50. The matched arcuate apertures form a circular opening for receiving the previously described bearings 11 through which a spider 51 is journaled or mounted between the forks 41 and 42, as illustrated.

The spider 51 has a hub or center member 52 with four radially projecting stub shafts 53 each having an outer chamfered end 54. The stub shafts on opposite sides of the hub are aligned on a common axis and the two axes are mutually perpendicular so the radially projecting stub shafts are X or cross configured.

Figure 4:
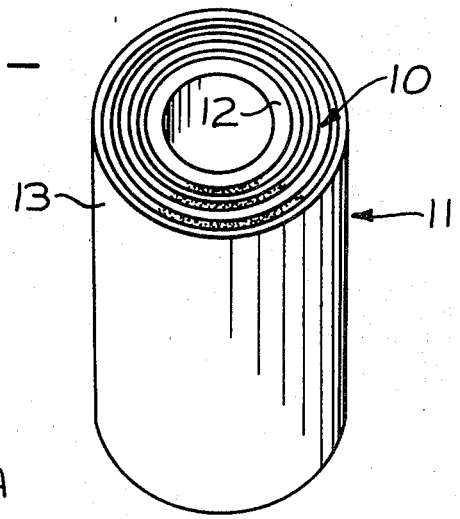
FIG. 4 is a perspective of a cylindrical bearing structure formed with the laminated bearings used with this invention.

Bearings 11, such as illustrated in FIG. 4, 5, and 6, which have been assembled on a core 12 and have an outer retaining sleeve 13 are assembled on the stub shafts 53 by pressing their retaining sleeve thereon. Subsequently, the spider 51 is assembled with the forks 41 and 42 employing end caps 48 to secure the outer retaining sleeve of each bearing on the associated end of its fork. If desired, the outer retaining sleeve 13 can be segmented, as shown in FIG. 7, with the gaps 13a closed when the bearing is clamped between the end and the end cap by tightening bolts 49.

The inner core 12 can be stretched slightly as it is forced on its stub shaft 53 to provide some of the desired radial preload. Also, other methods than the splines can be employed to couple the universal joint to the misaligned shafts it is coupling. Also, the mutually perpendicular axes need not be in a single plane as illustrated.

The radial preload on the cylindrical laminated bearings can vary from 0 to approximately 15,000 p.s.i. depending upon the wall thicknesses of the several metallic and elastomer cylindrical shells.

In the claims:

1. An improved universal joint comprising a pair of fork members with coupling means for attaching them respectively to the ends of misaligned shafts, a spider means for innerconnecting the bifurcated ends of said fork members respectively on mutually perpendicular axes through said spider means with two pair of spaced-apart journals, and cylindrical laminated bearings coupling each bifurcated end of each fork member and said spider means in their associated journal for limited oscillatory movement, each cylindrical laminated bearing having a plurality of concentric metallic and elastomer cylindrical shells with each metallic shell formed by a metal band disposed in a substantially helically edge-abutting relationship about a constant diameter whereby said cylindrical laminated bearings are capable of handling the radial and torsional loadings in their respective journals.

2. The improved universal joint defined in claim 1 wherein an elastomer cylindrical shell is disposed between each metallic cylindrical shell.

3. The improved universal joint as defined in claim 2 wherein the metal bands in adjacent metallic cylindrical shells are disposed in an opposite helical manner whereby uniform bidirection torsion resistance will be a characteristic of the cylindrical laminated bearings.

4. The improved universal joint defined in claim 3 wherein the cylindrical laminated bearing material is radially preloaded to decrease rotational deflections between the fork members of the universal joint.

5. The improved universal joint defined in claim 4 wherein the bifurcated ends of the fork members include end caps with attaching means, each end cap having an arcuate groove matching an arcuate groove in their associated bifurcated end of its fork member whereby the cylindrical laminated bearings can be radially constricted when said attaching means tighten each end cap on its inserted cylindrical laminated bearing to provide the preload.

6. The improved universal joint as defined in claim 5 wherein a segmented outer retaining shell surrounds each of the cylindrical laminated bearings.

7. The improved universal joint defined in claim 3 wherein the elastomer shells are bonded to the contiguous metallic shells.

8. The improved universal joint as defined in claim 5 wherein the cylindrical laminated bearings include an inner cylindrical core member with a central bore and the spider means includes radial projecting stub shafts on which said central bore of said core is press-fitted to mount each cylindrical laminated bearing on said spider means.

9. The improved universal joint as defined in claim 8 wherein the cylindrical laminated bearings include an outer retaining shell.

10. The improved universal joint as defined in claim 3 wherein the wall thickness of the metallic cylindrical shell is from 0.0015 to 0.020 inches and the wall thickness of the elastomer shells is 0.005 to 0.060 inches.

11. The improved universal joint defined in claim 10 wherein the elastomer cylindrical shells are formed of a rubber compounded for the desired characteristics.

12. The improved universal joint defined in claim 10 wherein any oscillation between the several fork members and the spider means occurs in the concentric laminate shells of the cylindrical laminated bearing eliminating any necessity for lubricating the universal joint.

13. The improved universal joint as defined in claim 4 wherein the radial preload on the cylindrical laminated bearings is of the order of 15,000 p.s.i.

* * * * *